Figure 1:
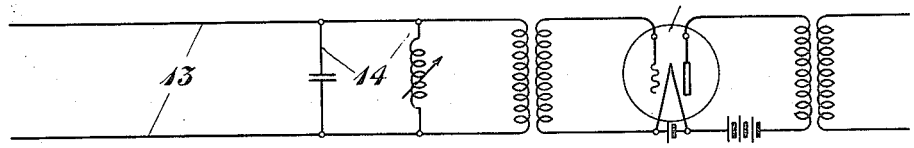

Oct. 7, 1924.

H. A. AFFEL 1,511,013

EQUALIZATION OF CARRIER TRANSMISSIONS

Filed July 8, 1920    5 Sheets-Sheet 1

INVENTOR
H. A. Affel
BY
ATTORNEY

Oct. 7, 1924.

H. A. AFFEL 1,511,013

EQUALIZATION OF CARRIER TRANSMISSIONS

Filed July 8, 1920

5 Sheets-Sheet 2

Fixed Equalizer, Variable Potentiometer

Variable Equalizer - Potentiometer

INVENTOR
*H. A. Affel*
BY
ATTORNEY

Oct. 7, 1924.

H. A. AFFEL 1,511,013

EQUALIZATION OF CARRIER TRANSMISSIONS

Filed July 8, 1920     5 Sheets-Sheet 3

INVENTOR
H. A. Affel
BY
ATTORNEY

Oct. 7, 1924.
H. A. AFFEL
1,511,013

EQUALIZATION OF CARRIER TRANSMISSIONS

Filed July 8, 1920   5 Sheets-Sheet 4

INVENTOR
H. A. Affel
BY
ATTORNEY

Oct. 7, 1924.
H. A. AFFEL
EQUALIZATION OF CARRIER TRANSMISSIONS
Filed July 8, 1920
1,511,013
5 Sheets-Sheet 5
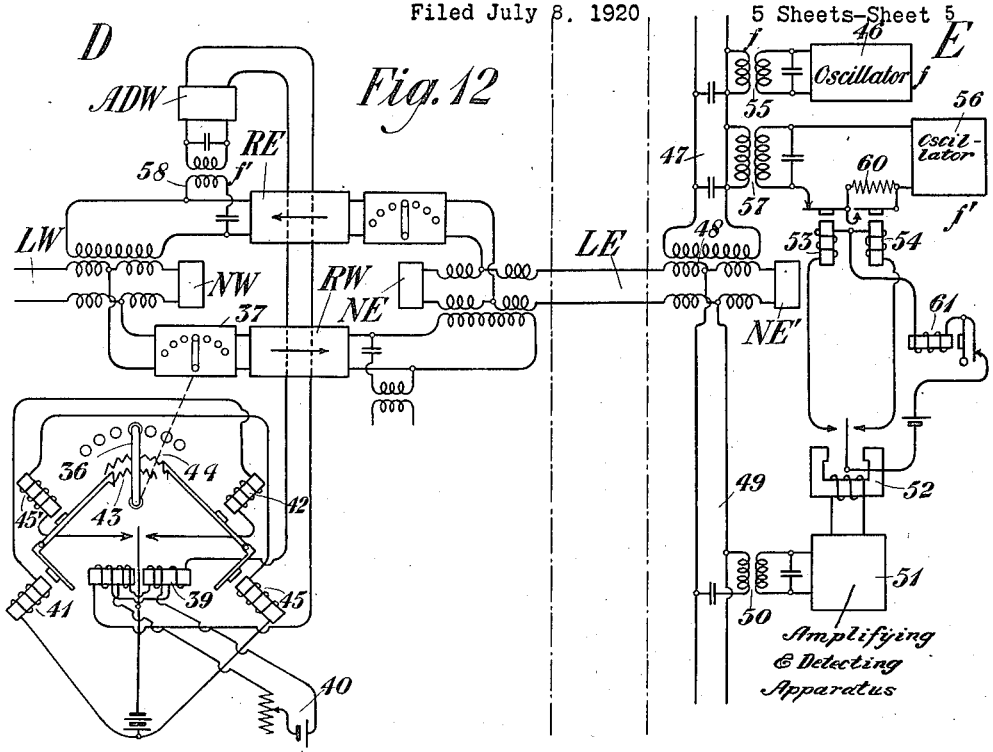
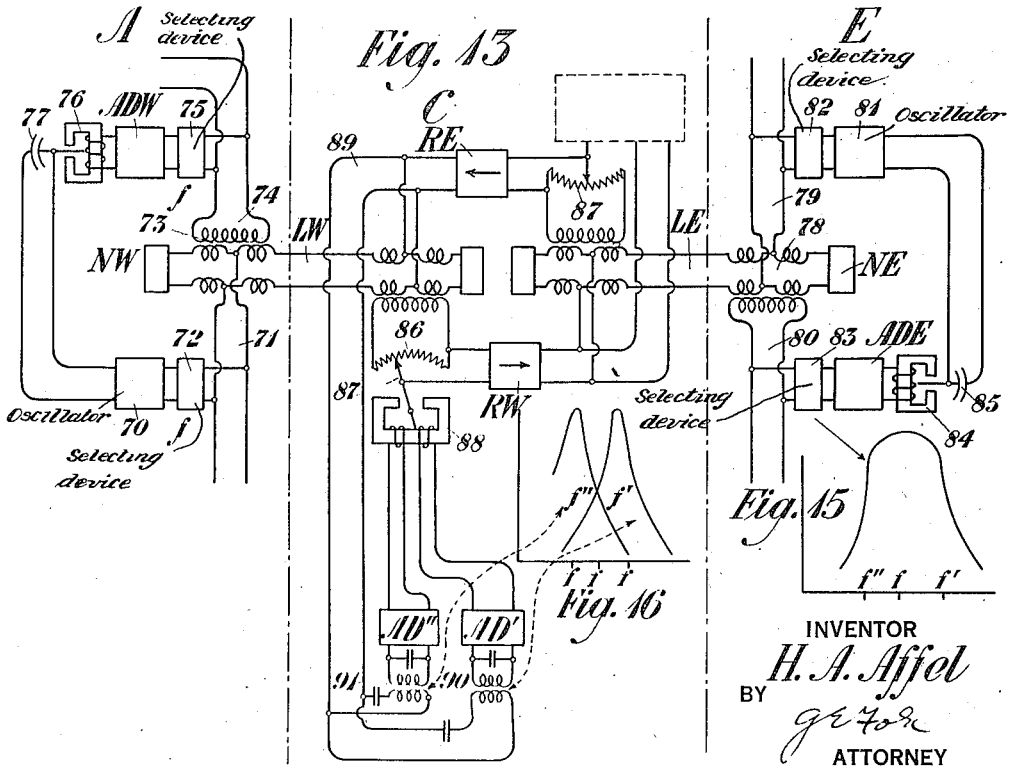
INVENTOR
H. A. Affel
BY
ATTORNEY Patented Oct. 7, 1924.

1,511,013

UNITED STATES PATENT OFFICE.

HERMAN A. AFFEL, OF BROOKLYN, NEW YORK, ASSIGNOR TO AMERICAN TELEPHONE AND TELEGRAPH COMPANY, A CORPORATION OF NEW YORK.

EQUALIZATION OF CARRIER TRANSMISSIONS.

Application filed July 8, 1920. Serial No. 394,767.

*To all whom it may concern:*

Be it known that I, HERMAN A. AFFEL, residing at Brooklyn, in the county of Kings and State of New York, have invented certain Improvements in Equalization of Carrier Transmissions, of which the following is a specification.

This invention relates to systems for the transmission of signals by means of carrier currents and more particularly to means and methods whereby the transmission efficiency of circuits of this character may be maintained substantially constant.

Where a plurality of signals are simultaneously transmitted over a common conducting system through the agency of carrier currents of different frequencies, it is desirable that the attenuation of the system, as regards the several frequencies, be maintained substantially constant, regardless of changes in the line conditions.

Changes in the attenuation of a system of this character are due to a variety of causes, but arise principally from variations in the leakage condition of the open wire lines employed as conductors, the attenuation being much greater during wet weather than during dry weather. This source of variation in the transmission efficiency of the circuit is quite distinct from the usual causes of transmission variations in long cable circuits operated at ordinary telephone frequencies, where the resistance variation with temperature is a controlling factor.

One of the objects of this invention is to provide means and methods whereby in a system employing carrier currents for the transmission of signals, the transmission efficiency of the circuit may be maintained substantially constant under various conditions. Another object of the invention is to provide means and methods whereby this result may be obtained through the agency of a pilot frequency, which is subjected to the changes in line conditions which affect the carrier frequencies employed for signaling, so that some element of the circuit may be adjusted to offset the attenuation changes indicated by the pilot frequency.

Other and further objects of the invention will be clear from the following description, when read in connection with the accompanying drawing in which—

Figure 5:
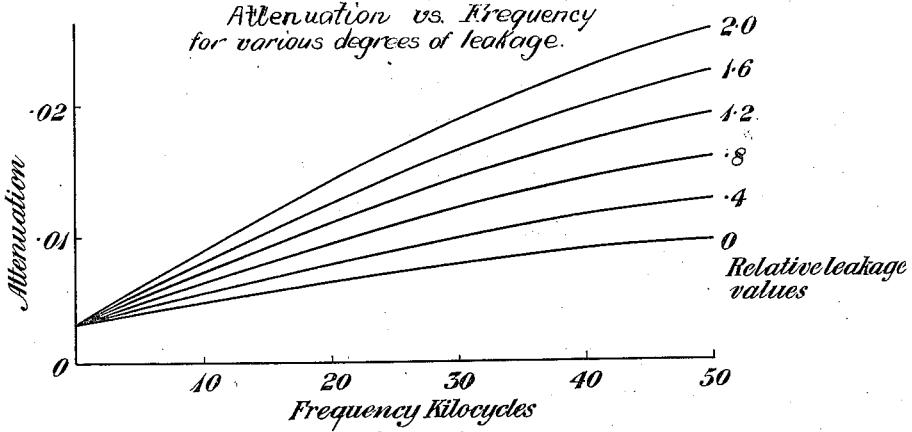
Figure 6:
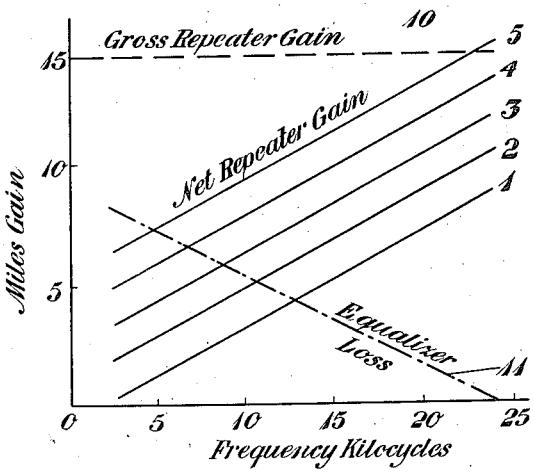
Figure 7:
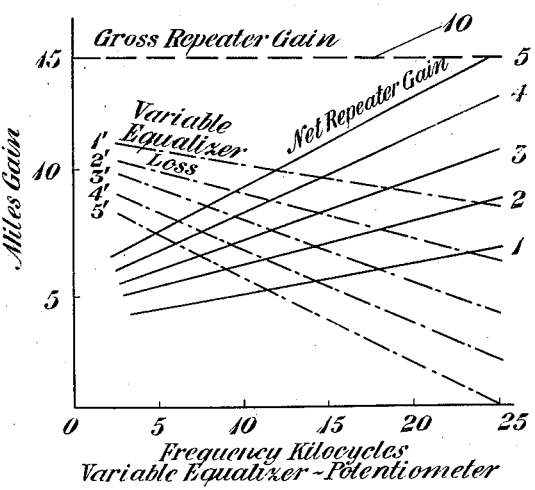
Figure 14:
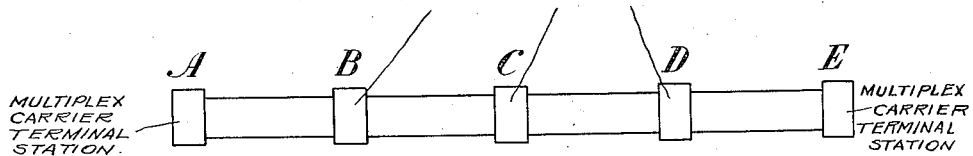

Figures 1 to 4, inclusive, are simplified circuit diagrams of a combined equalizer and potentiometer, utilized in connection with the invention;

Figs. 5 to 7, inclusive, are curves illustrating the principles of the combined equalizer and potentiometer;

Figs. 8 to 13, inclusive, are circuit diagrams illustrating a number of different embodiments of the invention;

Fig. 14 is a simplified diagram to indicate how the invention may be applied to a number of stations of the carrier system; and Figs. 15 and 16 illustrate curves showing certain features of the operation of the apparatus of Fig. 13.

In a transmission system employing carrier currents for the transmission of signals, the various frequencies superimposed upon the common conducting system and utilized as carriers, may extend over a considerable range of the total frequency spectrum. Changes in the attenuation due to leakage arising from wet weather conditions or the like, may produce markedly different effects upon the different frequencies, the highest frequency involved being attenuated to a much greater extent than the lowest frequency involved. Attenuation changes at high frequencies are further accentuated because line leakage increases with frequency and therefore forms a more controlling factor in determining the attenuation at a particular point.

In Fig. 5 a number of curves are given, showing the variation of attenuation with frequency, under different leakage conditions. The curve marked 0 indicates a variation in attenuation as the frequency increases, under conditions in which the smallest amount of leakage obtains. A comparison of this curve with the curves above, shows that as the leakage increases, the higher frequencies are attenuated to a much greater degree than the lower frequencies, for the same increase in measured direct current leakage.

In ordinary telephonic transmission, where all of the frequencies involved are relatively low, it has been the practice to include in the circuit a fixed equalizer whose attenuation with frequency under normal conditions varies in a manner complementary to that of the line. With an equalizer of this character in the circuit, the attenuation of the system as a whole will be constant for all telephonic frequencies involved, when normal transmission conditions prevail. Should the resistance of the circuit increase, due to a temperature change or the like, it has been found that such a change may be compensated by adjusting a resistance potentiometer, associated with an amplifier in the circuit.

The adjustment of the potentiometer produces the same correction for all frequencies and the application of this principle to a system employing frequencies of the order involved in carrier transmission, is indicated by the curves of Fig. 6. In this figure, the horizontal curve 10 indicates the repeater gain, which is uniform for all frequencies. The curve 11 represents the loss at different frequencies due to the equalizer. By subtracting the equalizer loss from the gross repeater gain, curve No. 5 is obtained, this representing the net repeater gain, with the equalizer in circuit. It will be seen from this curve, that that part of the system including the repeater and the equalizer, amplifies higher frequencies to a greater extent than the lower frequencies, thereby making up for the increased attenuation of the higher frequencies, as compared with the lower frequencies, during transmission over the line.

Curves Nos. 4, 3, 2 and 1 represent the net gain due to that part of the system comprising the repeater and equalizer at other settings of the potentiometer. These curves clearly show that for a given change in the setting of the potentiometer, an equal change will be produced in the effective transmission of all frequencies.

While an arrangement of this character has been found sufficiently satisfactory for ordinary telephonic transmission, where only low frequencies are involved, it falls far short of satisfying the requirements of a carrier system, in which the frequency range involved is quite large and the increased attenuation of the highest frequency involved will be much greater than that of one of the lower frequencies for a given change in the leakage condition of the circuit, as indicated in Fig. 5. Consequently, it is proposed to use, in connection with this invention, a combined equalizer and potentiometer which, when adjusted, will compensate for the effects produced upon different frequencies by changes in the line condition.

The principle of such a combined equalizer and potentiometer is indicated by the curves shown in Fig. 7, in which the horizontal curve 10 indicates the gross repeater gain as before. Curves 1' to 5' inclusive, indicate the variation of transmission loss with frequency, at different settings of the combined potentiometer and equalizer, due to the equalizer-potentiometer alone. By subtracting the values indicated by the curve 1' from the values indicated by the curve 10, the curve No. 1 is obtained, this curve representing the net gain of that portion of the system comprising the repeater and equalizer-potentiometer. In a similar manner, curves 2, 3, 4 and 5 are obtained from curves 2' to 5', inclusive. An examination of these curves shows that the net gain or loss due to a given change in the setting of the equalizer-potentiometer will be greater for the higher frequencies than for the lower frequencies, thereby compensating for the corresponding change in attenuation at different frequencies, due to a given change in the line conditions.

Figs. 1 to 4, inclusive, illustrate different arrangements of the equalizer-potentiometer for securing this result. In the arrangement illustrated in Fig. 1, 12 designates an amplifier or repeater, indicated schematically as a vacuum tube amplifier of well-known type, which amplifier, as is well understood, increases the amplitude of all frequencies alike. Across the input circuit 13 of this amplifier, an anti-resonant combination 14 is shunted. This anti-resonant combination comprises a capacity in parallel with a variable inductance.

If the inductance be set at a given value, the shunt path will be anti-resonant at a frequency which should be made higher than the highest carrier frequency involved. High frequencies approaching the frequency to which this combination is resonant, will be diverted through the anti-resonant shunt to a much less extent than the lower frequencies, so that lower frequencies transmitted to the repeater 12, will be attenuated to a much greater degree than the higher frequencies. By adjusting the inductance to shift the resonance point to a higher or lower position in the frequency spectrum, the change in attenuation due to a given change in the setting of the equalizer-potentiometer will be greater for the higher frequencies than for the lower frequencies, as indicated by the curves in Fig. 7.

Figure 2:
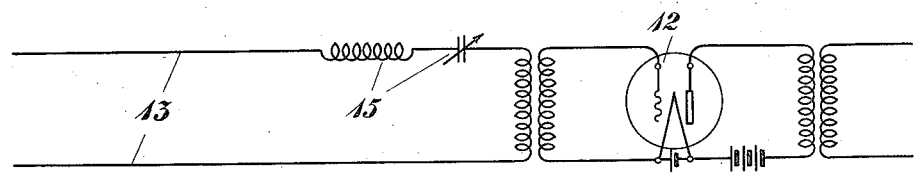

Fig. 2 shows a similar arrangement employing a series resonant combination 15 in the input circuit 13, instead of an anti-resonant combination, such as is used in Fig. 1. The series resonant combination includes a fixed inductance and an adjustable capacity and for a given setting of the capacity element the combination will be resonant at a particular frequency. If this frequency is above the highest carrier frequency involved, it will be readily seen that the effect of the combination is to transmit more readily the higher frequencies, which approach more nearly to the critical frequency to which it is resonant, than the lower frequencies. The loss due to this combination is clearly greater for lower frequencies than for higher frequencies. If the capacity be adjusted so that the combination becomes resonant at a still higher frequency, there will be an increase in the loss at all frequencies involved, but the increased loss will be greater for a given high frequency than for a given low frequency.

Figure 3:
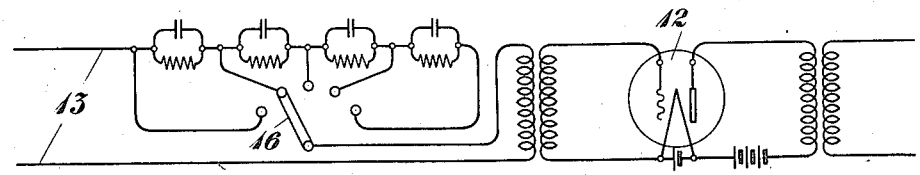

Fig. 3 illustrates an arrangement in which the change in the equalizer is produced by varying a serial element included in the input circuit 13. This element comprises resistance shunted by capacity and by setting the switch 16 to various positions, the amount of resistance and capacity included in the circuit will be varied. Since this arrangement changes both the resistance and the reactance component of the impedance of the input circuit, the change in the equalizer loss will be greater for a higher frequency than a lower frequency, as required by the curves in Fig. 7.

Figure 4:
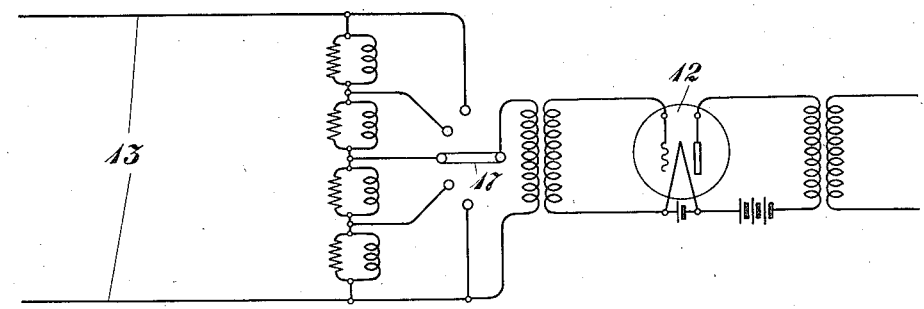

Fig. 4 illustrates a similar arrangement in which the equalizer-potentiometer is connected in shunt with the input circuit 13. The equalizer-potentiometer arrangement in this case comprises resistance in parallel with inductance and by adjusting the switch 17, both the resistance and reactance component of circuit 13 will be varied, so that an effect approximating that required by the curves of Fig. 7 may be obtained.

By means of the arrangements above described, it is possible to adjust the transmission circuit to compensate for changes in attenuation due to weather conditions or the like, providing the necessary degree of change is known. It now remains to be shown how the necessary degree of change in the setting of the potentiometer is to be obtained. In accordance with this invention, it is proposed to transmit over the circuit, subject to change in its transmission condition, a pilot frequency, preferably higher than the highest carrier frequency used for the transmission of signals, since the higher the frequency, the greater will be the effect produced upon it by a change in the leakage condition of the circuit. By means of the pilot frequency, an indication may be obtained of the transmission condition of the circuit and from this indication, the equalizer-potentiometer arrangements previously described may be set, either manually or automatically, in order to compensate for the indicated change.

With the use of a pilot frequency and an equalizer-potentiometer, several different operating methods may be pursued. Assume that we have a carrier transmission circuit, with terminals at A and E, as indicated in Fig. 14, with intermediate repeater points at B, C and D. In practice it is often customary to provide a repeater at the terminals A and E, as well as at the intermediate points, B, C and D, the gain of the terminal repeaters being half as great as that of intermediate repeaters. In a system such as above laid out, at least three controlling methods are possible, as follows:

1. A pilot channel could be arranged to begin and end in each line section interconnecting two repeaters. For instance, in the long line with terminals at A and E and line repeaters at B, C and D, it would be possible to have a pilot frequency source at station A, with a corresponding receiver at station B, to indicate the volume of the pilot frequency transmitted over the section between A and B. A separate pilot frequency source might be provided at station B, for transmitting to a corresponding receiver at station C. Similar arrangements would also be provided for the sections between stations C and D and stations D and E, respectively. A similar arrangement of apparatus might also be provided for transmission in the opposite direction. With this arrangement, if wet weather conditions existed in the section between A and B, the attending operators at these points would notice the corresponding lowering in the received currents of the pilot frequency and the operator at either station could make the necessary adjustments by means of the equalizer-potentiometer at that station, or could advise the operator at the other end of the section to make the necessary adjustment.

2. An alternative method, somewhat similar, would be to provide a pilot frequency source at one terminal station such, for instance, as station A, with corresponding receivers located at each intermediate repeater station and at the opposite terminal Station E. In this case, a change in the condition of the circuit in any section would manifest itself at all of the stations provided with receiving apparatus and if the operator at station B should set the equalizer-potentiometer for the indicated change in the line condition, the fact that the over-all transmission was restored to normal could be indicated by the receiving apparatus at stations C, D and E, so that the operators at said stations would not be required to make any adjustments. The effect of this method of operation might result, however, in the operator at station E, for instance, making the adjustment when the changes in line conditions only affected the section between stations A and B and should have been made by the operator at station B.

3. Another general method would be to have a pilot source and a corresponding receiving circuit at the terminals only and, irrespective of the location of the causes of the line change, have the gain adjusted uniformly at all intermediate and terminal repeater points. For instance, if in Fig. 14, there should be a pilot source provided at station A and a corresponding receiving circuit at station E, upon noting a variation in the current received at E, the attendant at this point would notify the operators at points B, C and D, who would adjust the corresponding equalizer-potentiometers equally until the attenuation, as recorded at E, becomes normal.

It will be understood, of course, that in accordance with all of the methods of operating above specified, the adjustment of the equalizer-potentiometer may be controlled automatically by some instrumentality associated with the pilot receiving circuit. Other methods of operation, whereby the desired constancy of transmission may be obtained, will readily suggest themselves.

Figure 8:
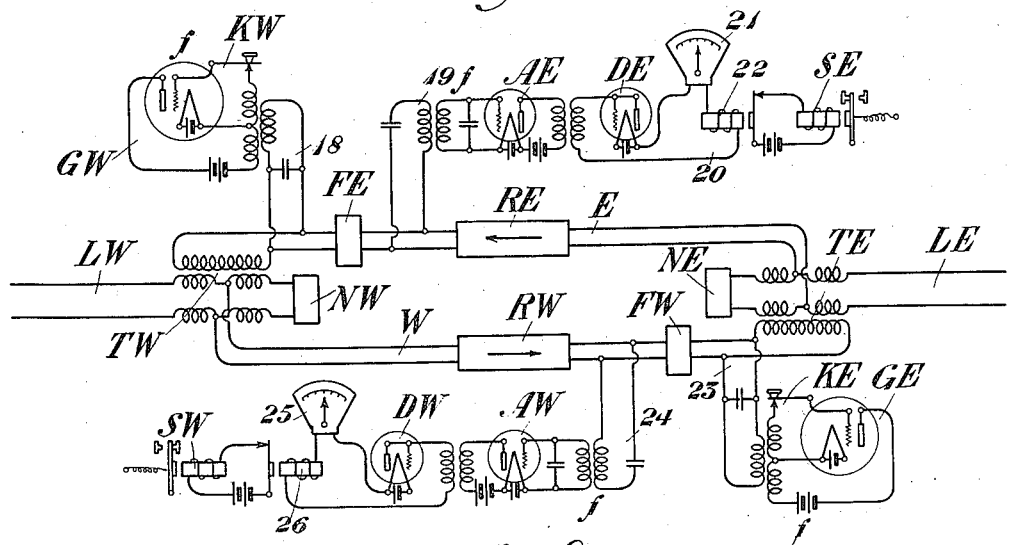

Fig. 8 illustrates a circuit arrangement for carrying out the first method of operation above outlined. In this figure, the apparatus for one of the intermediate stations, B, C or D is illustrated. This apparatus interconnects line sections LE and LW and comprises paths E and W of a two-way repeater circuit, these paths including repeating apparatus RE and RW, respectively. The repeating arrangements RE and RW include amplifiers and associated equalizer-potentiometers and these arrangements may assume any one of the four forms illustrated in Figs. 1 to 4, inclusive. Bridged across the output circuit of repeater RE is a circuit 18, tuned to the pilot frequency $f$. The generator GW is provided for generating the frequency $f$. This generator may be of any well-known type, but is illustrated as a well-known form of vacuum type oscillator, inductively associated with the tuned circuit 18. A second tuned circuit 19 is bridged across the output of repeater RE, between the circuit 18 and the repeater. This tuned circuit is also resonant to the pilot frequency $f$ and is coupled through an amplifier AE, which may be of the vacuum tube type, to a rectifier circuit 20, including a rectifying device DE. The rectifier circuit includes a milliammeter 21 and a relay 22, the latter controlling the local circuit of a sounder SE. A filter FE is included in the output circuit of the repeater RE between the two branches 18 and 19 to prevent currents of frequency $f$, generated by the oscillator GW from being transmitted to the tuned circuit 19. This filter is preferably of the type illustrated in the U. S. Patent to George A. Campbell No. 1,227,113 issued May 22, 1917, and is so designed as to transmit the various carrier frequencies employed for signaling while suppressing the pilot frequency, which is preferably higher than the other frequencies transmitted over the circuit.

Apparatus similar to that described in connection with the repeater RE is associated with the repeater RW. Thus, tuned circuits 23 and 24, tuned to the frequency $f$, are associated with the output circuit of the repeater RW and are separated by a filter FW, similar in construction to the filter FE. An oscillator GE is associated with the tuned circuit 23 and an amplifier AW, a rectifier DW, milliammeter 25, relay 26 and sounder SW are associated with the tuned circuit 24. Keys KW and KE are provided for the purpose of controlling the circuits of the generators GW and GE, respectively. It will be understood that in practice a single oscillator may be provided for transmission both east and west, instead of separate oscillators, as shown.

The operation is as follows: Normally, oscillations generated by the oscillator GW are transmitted through the tuned circuit 18 through the transformer TW and over the line section LW to the station at the terminal of line west. The filter FE prevents the pilot frequency thus transmitted from reacting upon the circuit 19 or the repeater RE, while the balanced transformer TW, together with the balancing network NW, prevents the pilot frequency from being transmitted to the path W. Similarly, the oscillator GE transmits a pilot frequency through the tuned circuit 23 and the transformer TE over the line section LE to the terminal station associated with said section. The filter FW prevents this frequency from reacting upon the tuned circuit 24 or the repeater RW, while the balanced transformer TE, together with the balancing network NE, prevent this frequency from being transmitted to the path E. By means of an oscillator similar to the oscillator GW, associated with the line section LE at the distant terminal station, a pilot frequency is transmitted from the distant terminal station over the line section LE to the path E and after being amplified by the repeating arrangement RE, passes into the tuned circuit 19, being prevented by the filter FE from reacting on the apparatus beyond said filter. This pilot frequency is then amplified by the amplifier AE and rectified by the rectifier DE, so that a pulsating direct current flows through the milliammeter 21 and the relay 22. If the line section LE is in normal condition, the milliammeter 21 will give a definite indication. Should the attenuation of the line section LE be increased by wet weather or other conditions, this fact will be indicated by the milliammeter 21, since the decrease in the current flowing through the milliammeter will be proportioned to the increased attenuation of the line section LE. The operator at the station illustrated may then signal the operator at the distant terminal station line section LE, by opening and closing the key KE, in accordance with a predetermined code.

The signaling operation at the distant terminal station may be understood from a description of the similar operation resulting at the station illustrated when the operator at the terminal station associated with the line LW signals. Should the operator at the latter station, by observing the reading of the milliammeter similar to the milliammeter 21 of the distant station observe a falling off in the current transmitted from the oscillator GW at the station illustrated, the operator will actuate the key corresponding to the key KE of the oscillator at the distant terminal station. Each time the circuit of the oscillator is interrupted by the key, the high frequency, which is now being transmitted from the terminal station through the repeater RW, tuned circuit 24, amplifier AW and rectifier DW to the milliammeter 25 and relay 26, will be interrupted. In response to each interruption, the relay 26 will be deenergized and will actuate the sounder SW. The operator at the station illustrated will set the equalizer-potentiometer associated with the repeater RW to the point indicated by the signaling operator at the distant terminal station associated with the line section LW. In a similar manner, the operator at the terminal station associated with the line section LE, upon observing a change in the current transmitted from the oscillator GE may, by interrupting a key corresponding to the key KW of an oscillator located at the terminal station, operate the sounder SE, thereby signaling the operator at the station illustrated to adjust the equalizer-potentiometer associatd with the repeater RE, so as to off-set the change in transmission observed at the distant station.

Figure 9:
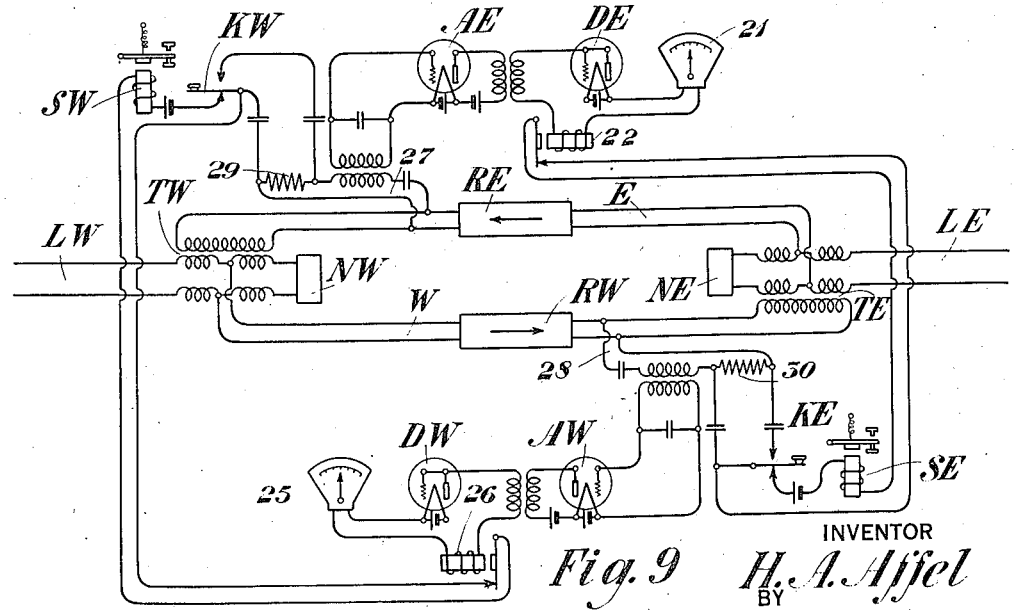

Fig. 9 illustrates an arrangement for operating in accordance with the second method above outlined. The apparatus illustrated in Fig. 9 may be provided at the intermediate stations, such as B, C and D in Fig. 14. At one of the terminal stations, such as A, an oscillator similar to those illustrated in Fig. 8 may be associated with the line for supplying the pilot frequency for transmission from west to east. A similar oscillator may be associated with the line at station E for supplying the pilot frequency for transmission from east to west. If both terminal stations include repeating apparatus, equalizer-potentiometers will be associated with the repeaters and receiving apparatus similar to that illustrated in Fig. 9 will be provided.

The receiving apparatus illustrated in Fig. 9 is similar to that already described in Fig. 8 and need not be further discussed. In this modification, however, the receiving apparatus is associated with the repeaters RE and RW through tuned circuits 27 and 28, respectively. Since the pilot frequency is to be transmitted over the full length of the line, through all of the repeater stations, these tuned circuits normally include resistances 29 and 30, to prevent all the energy of the pilot frequency from being absorbed by the first receiving apparatus encountered. In order that the operators at the various stations may transmit signals, the keys KW and KE are arranged to short-circuit the resistances 29 and 30 through suitable condensers, thereby substantially preventing the transmission of the pilot frequency to stations beyond the station at which a key is actuated, and consequently operating the sounders at the stations beyond. The repeaters RE and RW will, as before, include adjustable equalizer-potentiometers.

The operation is as follows: Normally, the pilot frequency generated by the oscillator at station E will be transmitted over the line and at the station illustrated in Fig. 9 will pass from the line section LE through the path E to the amplifying arrangement RE. From the amplifying arrangement, the amplified pilot frequency passes through the transformer TW and on out to the line LW through the succeeding stations in a similar manner. A portion of the energy of the amplified pilot frequency will be absorbed by the tuned circuit 27 and transmitted from the amplifier AE and the rectifier DE to actuate the milliammeter 21 and the relay 22 at the station illustrated. The milliammeters and relays at the other stations will be actuated in a similar manner. The transmission of the pilot frequency impressed upon the line by the oscillator at the station A will also actuate the milliammeters similar to 25 and the relays similar to 26, at each station.

If, now, an increase in attenuation occurs in any line section, the milliammeters at the various stations will indicate this fact by a falling off in their readings, which will be proportioned to the increase in attenuation. The operator at any station may, therefore, compensate for the increased attenuation by adjusting the equalizer-potentiometers associated with the repeating apparatus RE and RW, at the station where the operator is located. Should the operator at the station illustrated in Fig. 9 desire to signal the attendants at stations to the west, the key KW may be actuated to short-circuit the resistance 29, so that the pilot frequency, after passing through the repeater RE, will be diverted almost exclusively to the tuned circuit 27. The milliammeters corresponding to 21 and the relays corresponding to 22 at the stations to the west of the station illustrated, will no longer receive current and the relays will, therefore, be deenergized to actuate the corresponding sounders. The operator at the station at Fig. 9 may, in a similar manner, signal the attendants at stations east of this point by manipulating the key KE.

Figure 10:
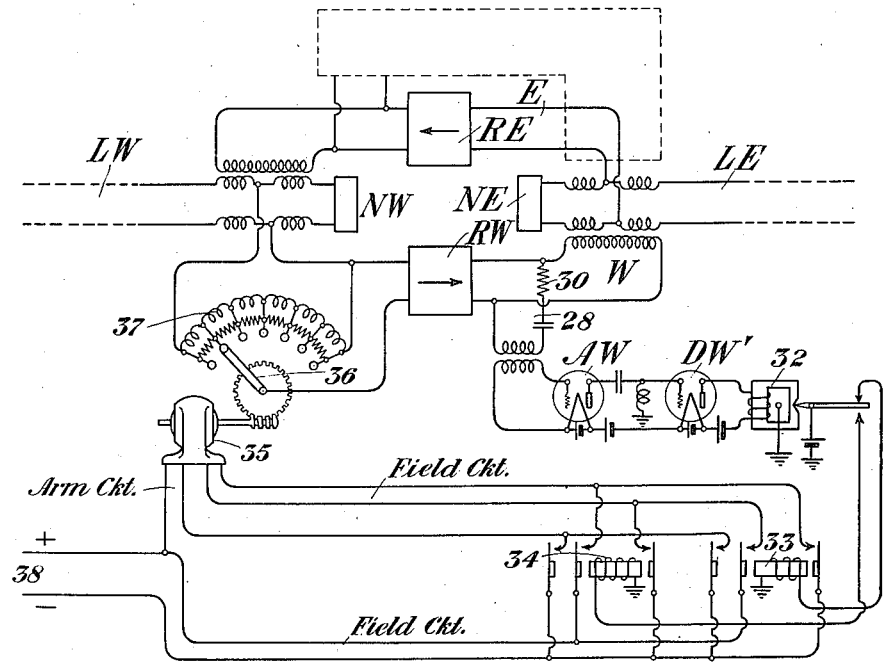

The second method of operation above outlined may be carried out automatically by means of the arrangement illustrated in Fig. 10. In accordance with this arrangement, the receiving apparatus comprises an amplifier AW and a vacuum tube detector DW′ in the output circuit of which a contact milliammeter 32 is included. With the transmission line in normal condition, the pilot frequency transmitted over the line will be of sufficient amplitude to maintain the contact of the milliammeter in neutral position. Relays 33 and 34 are associated with the alternate contacts of the milliammeter, for the purpose of controlling the field and armature windings of a motor 35. One of these relays, when actuated, causes the motor to revolve in one direction and the other relay, when actuated, causes the motor to revolve in the opposite direction. A switch 36 is arranged to be controlled by the rotation of the motor 35 and this switch determines the setting of an equalizer-potentiometer 37 in the input circuit of the repeater RW. The equalizer-potentiometer 37 as here illustrated is of the type shown in Fig. 4, but may be of the type shown in Figs. 1, 2, or 3, if desired. Similar apparatus will be associated with the repeater RE but this apparatus is merely indicated schematically, as shown in dotted lines.

The operation is as follows: Normally, the pilot frequency incoming from the line LW, upon being amplified by the amplifier RW is partially absorbed by the tuned circuit 28. The energy thus absorbed, when amplified by the amplifier AW and impressed upon the detector DW′, causes a sufficient flow of pulsating direct current in the out-put circuit of the detector to cause the contact milliammeter 32 to hold its armature in neutral position. Should an increase in the attenuation of the line section LW occur, the energy of the pilot frequency will be decreased and the milliammeter 32 will permit its armature to be retracted to its lower contact, thereby energizing the relay 34. Relay 34 at its extreme left-hand contact connects source 38 to the armature circuit of the motor 35 and at its two remaining contacts, completes the circuit of the field winding motor 35, so that current flows there through in a definite direction. The motor 35 will, therefore, be caused to rotate and move the switch 36 in such a direction as to reduce the current shunted through the equalizer-potentiometer 37 and thereby increase the effective amplification of the amplifier AW. When the switch 36 has been rotated a sufficient degree to bring the energy of the pilot frequency in the output circuit of the amplifier RW up to normal, the armature of the milliammeter 32 will again assume its neutral position and the relay 34 will be deenergized and the rotation of the motor 35 will cease.

Should the attenuation of the line section LW be decreased, the armature of the milliammeter 32 will be shifted to its upper contact, thereby energizing the relay 33. The extreme left hand contact of the relay 33 completes the armature circuit of the motor 35, as before. The remaining contacts of the relay 33 connect the field winding to the source 38 in such a manner that current flows through the field winding in a direction opposite to that described in connection with the operation of the relay 34. The motor 35 now rotates in the opposite direction and shifts the switch 36 in a direction to increase the amount of current shunted through the equalizer-potentiometer 37, thereby decreasing the effective amplification of the amplifier RW. When the setting of the equalizer-potentiometer has been changed sufficiently to bring the energy of the pilot frequency in the output circuit repeater RW up to normal, the armature of the milliammeter 32 will be shifted to neutral position and the motor will cease to rotate.

Figure 11:
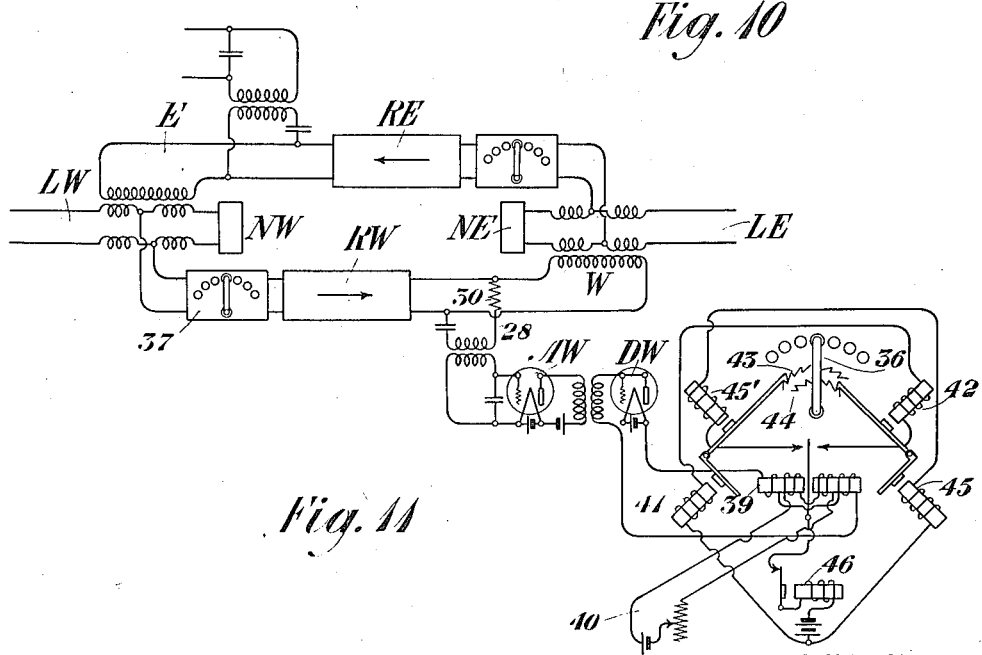

A modified arrangement for producing the same result is illustrated in Fig. 11. This arrangement differs from that illustrated in Fig. 10, in that a rectifier DW is substituted for the detector DW′ and a differential polarized relay 39 is provided for controlling the setting of the equalizer-potentiometer. The relay 39 has one set of windings included in the circuit of the rectifier DW and is also provided with biased windings included in the circuit with the direct current source 40. With the transmission line in normal condition, the rectified current flowing through the tube DW is sufficient to just neutralize the current flowing through the biasing windings, so that the armature of relay 39 will stand in neutral position. If the rectified current increases, the armature is shifted in one direction, while if the rectified current decreases, the current flowing through the biasing windings preponderates over the rectified current and shifts the armature to its opposite position. The relay 39 controls the circuits of stepping magnets 41 and 42 which actuate ratchet wheels 43 or 44, as the case may be, to shift the switch 36 of the equalizer-potentiometer 37. Release magnets 45 and 45' are provided, so that when one stepping magnet is being actuated, the pawl controlled by the other stepping magnet is withdrawn from the corresponding ratchet wheel. An interrupter 46 is provided to cause intermittent energization of the stepping and release magnets. The equalizer-potentiometer 37 controlled by the switch 36 is merely indicated schematically and may be of any one of the types illustrated in Figs. 1 to 4, inclusive. It will be also understood that apparatus similar to that already described will be associated with the repeater RE.

The operation is as follows: An increase in the attenuation of the line section LW causes a decrease in the amplified pilot frequency supplied to the circuit 28 and consequently the rectified current flowing through the outer windings of the relay 39 will be decreased. The direct current flowing through the biasing windings will, therefore, preponderate and cause the armature of the relay to be shifted to one of its contacts, say, the left hand contact. A circuit is thereby completed for the battery through the interrupter 46, over the left hand contact of the relay 39, through the winding of release relay 45' and through the winding stepping relay 45, back to battery. The relay 45' withdraws the pawl of stepping relay 41 from the ratchet wheel 43 and the stepping relay 45 now actuates the ratchet wheel 44, step by step. The switch 36 is therefore rotated and changes the setting of the equalizer-potentiometer until the energy of the pilot frequency in the output circuit of the amplifier RW is brought up to normal. When this condition occurs, the rectified current passing through the rectifier DW is sufficient to neutralize the current flowing through the biasing windings of the relay 39 to such an extent that the armature is shifted to neutral position and the equalizer-potentiometer remains in the position to which it has been shifted.

Should a decrease in attenuation occur, the rectified current flowing through the outer windings of the relay 39 will be increased so that the armature of the relay is shifted to its right hand contact, thereby closing a circuit through the buzzer 46, release magnet 42 and stepping magnet 41 to battery. The switch 36 is now stepped in the opposite direction and changes the setting of the equalizer-potentiometer until the amplitude of the pilot frequency is brought up to normal, when the relay 39 again shifts its armature into neutral position and the equalizer-potentiometer remains in the position to which it has been shifted.

Fig. 12 illustrates an arrangement for operating in accordance with the third method above outlined. The apparatus associated with the terminal station E and one intermediate station D is illustrated. At the station E, a constant output oscillator schematically indicated at 46, is provided for impressing a pilot frequency $f$ through tuned circuit 55 upon a circuit 47, associated through transformer 48 with the line section LE. This corresponds to the pilot source required by the third method of operation. The corresponding receiving apparatus for the terminal station comprises a circuit 49, associated with the line LE and connected through tuned circuit 50 to an amplifying and detecting apparatus 51, which may be similar to that illustrated in Fig. 10. A contact milliammeter 52 is associated with the detector and controls the circuits of relays 53 and 54. These relays in turn control the amplitude of a controlling frequency $f'$, generated by an oscillator 56 which, like the oscillator 46, may be similar to the oscillator illustrated in Fig. 8. The controlling frequency $f'$ is supplied to the circuit 47 through tuned circuit 57 and when transmitted over the line circuit, is utilized to control the setting of the equalizer-potentiometers at the intermediate stations. It will be understood that apparatus similar to that shown at station E will be provided at station A.

At station D, a tuned circuit 58 is bridged across the output of the repeater RE and this circuit is tuned to the frequency $f'$. An amplifying and detecting apparatus ADW is schematically illustrated as being associated with the tuned circuit 58. This apparatus may be similar in construction to the amplifying and detecting apparatus illustrated in Fig. 11. The output circuit of the detector is arranged to control the relay 39 which determines the setting of the equalizer-potentiometer through switching apparatus similar to that illustrated in Fig. 11. This switching apparatus controls an equalizer-potentiometer 37, in the input circuit of repeater RW. The equalizer-potentiometer schematically illustrated in the drawing may be of any of the forms illustrated in Figs. 1 to 4, inclusive. It will be understood that apparatus similar to that already described will be provided at station D for transmission in the opposite direction and that the apparatus at station D will be duplicated at each of the other intermediate repeater stations.

The operation is as follows: Normally, an oscillator similar to the oscillator 46 and generating a pilot frequency $f$ at the terminal station A (not illustrated) supplies the generated frequency to the transmission line, so that the pilot frequency $f$ is transmitted from west to east through the various repeaters, such as RW. With the transmission lines in normal condition, this frequency will arrive at the terminal station E with such amplitude as to cause the contact milliammeter 52 to hold its contact in neutral position. At the same time, the frequency $f$ generated by the oscillator 56 at station E is transmitted through a resistance 60 and through the tuned circuit 57, to the line section LE and thence through the repeater RE and over the succeeding line sections. The resistance 60 is so proportioned that, with the lines in normal condition, the energy of frequency $f'$, absorbed by tuned circuit 58 at station D and similar tuned circuits at other stations, will be just sufficient to act through the amplifying and detecting arrangements ADW at the various intermediate stations, to maintain the armatures of relays 39 at the various intermediate stations in neutral position.

If an increase in attenuation should occur at any point along the line, the amplitude of the pilot frequency $f$ arriving at station E after transmission from station A, will be less than normal, so that the contact milliammeter 52 will shift its armature to its left hand contact, thereby completing a circuit for the relay 53 through the interrupter 61. Relay 53 is, therefore, intermittently energized and each time it is energized, it opens the circuit leading to the oscillator 56, thereby interrupting the frequency $f'$ supplied to the line. Upon interruption of this frequency, the amplifying and detecting apparatus ADW at station D functions to cause the relay 39 to shift its armature from the neutral position to its right hand contact. Each time the armature is shifted, in response to the intermittent action of the relay 53, the release magnet 42 is actuated to withdraw the pawl of stepping magnet 45 from the ratchet wheel 44 and the stepping magnet 41 is actuated to step the ratchet wheel 43 one step. The switch 36 is, therefore, moved step by step and changes the setting of the equalizer-potentiometer 37 to increase the net gain of the repeater. A similar action takes place at each of the intermediate stations and as soon as the repeater gain has been increased sufficiently to bring the amplitude of frequency $f$ received at station E up to normal, the contact milliammeter 52 shifts its armature to neutral position and the actions previously described cease. The equalizer-potentiometers at the various intermediate stations will, therefore, remain in the positions to which they have been shifted.

If a decrease in attenuation should, for any reason, take place at any point along the line, the current of frequency $f$ transmitted from station A and received at station E will be increased in amplitude, so that the armature of the milliammeter 52 will be shifted to the right and the relay 54 will be intermittently energized. Each time the relay 54 is energized the resistance 60 is short-circuited and current of frequency $f'$ from the oscillator 56 is transmitted to the line with the increased amplitude. The increased amplitude of the frequency $f'$ at station D causes the amplifying and detecting apparatus ADW to function, to shift the armature of the relay 39 to the right each time the relay 54 is energized. This results in stepping the switch 36 in the opposite direction, until amplitudes of frequency $f$ arriving at station E is brought to normal.

Transmission in the opposite direction will be regulated through the receiving apparatus at station A, in response to the frequency $f$ generated by the oscillator 46 at station E and transmitted over the line.

It will be observed that in the arrangement illustrated in Fig. 12, two pilot channels of different frequencies are required, in order to control the setting of the equalizer-potentiometers. A modified arrangement is illustrated in Fig. 13, in which the same result can be obtained by using a single pilot channel. In this case a change in amplitude of the pilot frequency indicates the change in attenuation and actuates the receiving apparatus at the terminal station, to slightly change the frequency of the pilot frequency transmitted in the opposite direction, this change in frequency being utilized to effect the change in the setting of the equalizer-potentiometers. In this figure, the apparatus at terminal stations A and E and one intermediate station C is illustrated. At station A an oscillator 70, which may be of the well-known vacuum tube type, generates a frequency $f$, which may be applied to a circuit 71 through a selecting device 72, such as tuned circuit. The circuit 71 is bridged across the midpoints of the transformer arrangement 73, associating the line LW with a receiving circuit 74. An artificial line or network NW is provided for balancing the line section LW. The receiving circuit 74 is associated through a selecting device 75, such as a tuned circuit, with an amplifying and detecting apparatus ADW. The selecting device 75 is tuned to the frequency $f$, generated by an oscillator at station E, corresponding to the oscillator 70 at station A. The amplifying and detecting apparatus ADW may be of the type illustrated in Fig. 10 and controls a contact milliammeter 76, which is similar to the contact milliammeter 32 in Fig. 10. This milliammeter, however, is modified so that instead of controlling contacts, its armature changes the frequency generated by the oscillator 70 in any well-known manner, such as by changing the capacity of condenser 77, in the circuit of the oscillator. Since the frequency of the pilot channel will be changed from time to time, instead of using a tuned circuit for selective purposes, the selective devices 72 and 75 may comprise filters having a characteristic such as is indicated by the curve of Fig. 15. A suitable device for this purpose is the wave filter described in the Campbell patent, previously referred to.

At station E, apparatus similar to that at station A will be provided. Thus, the line LE terminates at said station in a balanced transformer arrangement 78, of well-known construction, whereby the transmitting circuit 79 and the receiving circuit 80 may be associated with the line section. The line LE may be balanced by network NE, in order to render the transmitting and receiving circuits substantially conjugate. An oscillator 81, similar to the oscillator 70, may be connected with the transmission circuit 79 through a filter 82, which is adapted to transmitting a band of frequencies in the neighborhood of the frequency $f$. Similarly, an amplifying and detecting apparatus ADE is associated with the receiving circuit 80 through a similar filter 83. The amplifying and detecting apparatus ADE controls a milliammeter device 84 for adjusting the condenser 85, which controls the frequency of the oscillator 81.

At the intermediate station, the equalizer-potentiometers 86 and 87 are associated with the repeaters RW and RE, respectively. These equalizer-potentiometers are schematically indicated as being merely resistance devices but it would be understood that in actual practice they may be arrangements of the type illustrated in Figs. 1 to 4, inclusive. The equalizer-potentiometer 86 is controlled by the movable armature 87 of a magnetic device 88. A circuit 89 is bridged across the output side of the amplifier RE and this circuit terminates in two sharply tuned branches 90 and 91. The branch is made sharply resonant to a frequency $f'$, a little higher than the frequency $f$, while the branch 91 is sharply tuned to a frequency $f''$, just a little below the frequency $f$. The resonance curves for these frequencies and their relation to each other are illustrated by the curves in Fig. 16. Amplifying and detecting devices AD' and AD'' are associated with the tuned circuits 90 and 91, respectively. These devices may be similar in general construction to the amplifying and detecting arrangement illustrated in Fig. 10. The output circuit of each of these devices includes a winding upon the core of the magnetic device 88, so that this device may be controlled to shift the equalizer-potentiometer in a manner hereinafter described. It will be understood that similar apparatus may be provided at station C for transmission in the opposite direction, this apparatus being schematically indicated by the dotted lines at the upper part of the figure.

The operation is as follows: With the line circuit in normal condition, the oscillator 70 would generate a frequency $f$, which is transmitted through the filter 72 over the circuit 71 to the line section LW. This frequency then passes through the equalizer-potentiometer 86 and amplifier RW to the line section LE and is transmitted over said line section to the station E, where it is received in the circuit 80. From the circuit 80 the frequency $f$ passes through the filter 83 to the amplifying and detecting apparatus ADE. The amplitude of the energy of frequency $f$ thus received will be just sufficient to maintain the milliammeter device 84 in neutral position, so that the condenser 85 is set to cause the oscillator 81 to generate a frequency $f$, which is transmitted through the filter 82, over the line LE and through the repeater RE to the line LW and thence into the receiving apparatus at station A. The amplitude of this frequency will be such that the milliammeter device 76 at station A will be in neutral position with the condenser 77 so adjusted that the frequency of oscillator 70 will be frequency $f$, as already stated. At station C a portion of the energy of frequency $f$ transmitted from the oscillator 81 will pass into the circuit 89 and will divide equally between the tuned branches 90 and 91, to actuate the amplifying and detecting devices AD' and AD''. Since the amplifying and detecting devices AD' and AD'' are equally affected by the frequency $f$, the current flowing through the two windings of the magnetic device 88 is equal and the armature switch 87 will remain in any position in which it happens to be at that time, since there is no magnetic force to shift its position. If, now, the attenuation of the line section LW should be increased, the frequency $f$ will arrive at station E decreased in amplitude. Consequently, the amplifying and detecting apparatus ADE will actuate the milliammeter device 84 to shift its armature, thereby changing the capacity of the condenser 85, so that the oscillator 81 will generate a frequency $f'$, instead of frequency $f$. The frequency $f'$ transmitted back over the line from east to west will, after being amplified by the amplifier RE, be partially diverted into the circuit 89. This energy of frequency $f'$ will be transmitted through the tuned circuit 90, rather than the tuned circuit 91 and consequently the right hand winding of the magnetic device 88 will receive more current than the left hand winding. The armature switch 87 will consequently begin to move under the magnetic pull of the device 88, in such a direction as to change the setting of the equalizer-potentiometer 87 to increase the net gain of the amplifier RW. As soon as the setting of the equalizer-potentiometer has been changed sufficiently to bring the amplitude of the frequency received at the station E up to normal, the amplifying and detecting apparatus ADE will function to cause the milliammeter device 84 to restore its armature to neutral position, thereby adjusting the condenser 85 so that the oscillator 81 again generates a frequency $f$. The frequency $f$ at station C, upon being transmitted to the circuit 89, divides equally between the device AD' and AD'', so that the same current again flows through both windings in the magnetic device 88. Consequently, the armature switch 87 will remain in the position to which it has been shifted and the equalizer potentiometer setting will remain as before.

If a decrease in attenuation should occur in the line section LW, the amplitude of frequency $f$ received in the circuit 80 at station E will be increased, with the result that the condenser 85 will be adjusted so that the oscillator 81 generates a frequency $f'''$. This frequency at station C is selected by the circuit 91, so that a greater current flows through the left hand winding of device 88, than flows through its right hand winding. As a result, the armature switch 87 is shifted in the opposite direction, until the setting of the equalizer-potentiometer is such that the amplitude of the frequency received in the circuit 80 is again normal. When this occurs, the condenser 85 is adjusted to its normal position and the oscillator 81 again generates a frequency $f$, so that at station C the current in the two windings of the device 88 is again equalized and the armature switch 87 will remain in the shifted position.

It will be obvious that the general principles herein disclosed may be embodied in many organizations widely different from those illustrated, without departing from the spirit of the invention, as defined in the following claims.

What is claimed is:

1. In a signaling system in which a plurality of signals are simultaneously transmitted over a common conducting path by means of carrier currents of different frequencies, the method of maintaining the transmission substantially constant for all transmission frequencies which consists in subjecting a pilot channel to substantially the same conditions causing attenuation as those affecting the transmission frequencies, producing an indication by current transmitted over the pilot channel and so adjusting the transmission characteristics of the circuit in accordance with the indication produced when the indication is abnormal as to substantially restore to normal the transmission of the carrier frequencies.

2. In a signaling system in which a plurality of signals are simultaneously transmitted over a common conducting path by means of carrier currents of different frequencies, the method which consists in subjecting a pilot frequency to substantially the same conditions causing attenuation as those which affect the transmission frequencies, producing by said pilot frequency an indication which is a function of the attenuation for that frequency, and adjusting the transmission of the circuit at each transmission frequency by an amount corresponding to the change in attenuation at each trasmission frequency which is indicated by the pilot frequency.

3. In a signaling system in which a plurality of signals are simultaneously transmitted over a common conducting path by means of carrier currents of different frequencies, the method which consists in subjecting a pilot channel to substantially the same conditions causing attenuation as those which affect the transmission frequencies, producing an indication by current transmitted over said pilot channel and adjusting both the resistance and reactance components of the circuit in accordance with any change in attenuation indicated by the pilot channel so that the impedance of the circuit for all transmission frequencies will be substantially constant.

4. In a signaling system a transmission path, means for simultaneously transmitting a plurality of signals thereover by means of carrier currents of different frequencies, means for transmitting a pilot frequency over the path, receiving apparatus responsive to the pilot frequency, said receiving apparatus being responsive to any change in the attenuation of the pilot frequency, and means to adjust the transmission of the path for the transmission frequency in accordance with any change in attenuation indicated by the receiving apparatus.

5. In a signaling system a transmission path, means for simultaneously transmitting a plurality of signals thereover by means of carrier currents of different frequencies, means for transmitting a pilot frequency over the path, receiving apparatus responsive to the pilot frequency, said receiving apparatus being responsive to any change in the attenuation of the pilot frequency, and means to adjust both the resistance and reactance components of the path in accordance with any change in attenuation indicated by the receiving apparatus so that changes in the impedance at different frequencies due to the change in attenuation indicated by the pilot frequency will be proportionately compensated.

6. In a signaling system a transmission path, means for simultaneously transmitting a plurality of signals thereover by means of carrier currents of different frequencies, means for transmitting a pilot frequency over the path, receiving apparatus responsive to any change in the amplitude of the received pilot frequency, and means to adjust the transmission of the path at all transmission frequencies in accordance with any change in amplitude of the pilot frequency indicated by said receiving apparatus.

7. In a signaling system a transmission path, means for simultaneously transmitting a plurality of signals thereover by means of carrier currents of different frequencies, means for transmitting a pilot frequency over the path, receiving apparatus responsive to any change in the amplitude of the received pilot frequency, and means to adjust both the resistance and reactance components of the path in accordance with any change in amplitude indicated by said receiving apparatus so that the transmission of the path at different frequencies will be proportionately modified to compensate for the change in attenuation indicated by the receiving apparatus.

8. In a signaling system a transmission path, means for simultaneously transmitting a plurality of signals over said path by means of carrier currents of different frequencies, repeater stations including repeaters at certain points in said path, potentiometers comprising both resistance and reactance associated with the repeaters at said repeater stations, means to impress a pilot frequency upon said path, receiving apparatus to indicate any change in the attenuation of said path to which said pilot frequency is subjected, means to adjust the potentiometer associated with at least one of said receiver stations to change both the resistance and reactance components of the path at the different carrier frequencies in accordance with the changes in attenuation indicated by said receiving apparatus.

9. In a signaling system a transmission path, means to simultaneously transmit a plurality of signals over the said path by means of carrier currents of different frequencies, repeaters at different points in said path, a potentiometer comprising both resistance and reactance associated with each repeater, means to impress a pilot frequency upon said path at one terminal, means to receive said pilot frequency at the other terminal, said means being responsive to any changes in the attenuation of the path to which the pilot frequency is subjected, and means to adjust the potentiometer associated with each repeater to change both the resistance and reactance components of the path at the various carrier frequencies in accordance with the change in attenuation indicated by the pilot frequency.

10. In a signaling system a transmission path, means to simultaneously transmit a plurality of signals over said path by means of carrier currents of different frequencies, repeaters at various points in said path, potentiometers comprising both resistance and reactance associated with each repeater, means for impressing a pilot frequency upon said path, receiving apparatus responsive to said pilot frequency, and means automatically responding to said receiving apparatus for adjusting the potentiometers at said repeater points to change both the resistance and reactance components of the path at the various carrier frequencies in accordance with any change in attenuation to which the pilot frequency has been subjected.

11. In a signaling system a transmission path, means for simultaneously transmitting a plurality of signals over said path by means of carrier currents of different frequencies, repeaters at various points in said path, potentiometers comprising both resistance and reactance associated with said repeaters, means to apply a pilot frequency to said path at one terminal thereof, receiving apparatus at the other terminal of said path, said receiving apparatus indicating any change in the amplitude of the pilot frequency, means automatically responsive to a change in amplitude of the received pilot frequency for adjusting said potentiometers so that both the resistance and reactance components of said path at the various carrier frequencies will be changed in accordance with any change in amplitude of the received pilot frequency.

12. In a signaling system a transmission path, means for simultaneously transmitting a plurality of signals over said path by means of carrier currents of different frequencies, repeaters at various points in said path, potentiometers comprising both resistance and reactance associated with said repeaters, means to apply a pilot frequency at one terminal of said path, receiving apparatus at the other terminal of said path, said receiving apparatus being responsive to any change in the amplitude of the received pilot frequency, means responsive to changes in amplitude of the received pilot frequency to apply another frequency to the receiving terminal of the path for transmission in the opposite direction, and means automatically responsive to said other frequency for adjusting potentiometers to change both the resistance and reactance components of the path at different frequencies.

13. The method of maintaining the transmission of a carrier circuit substantially constant for all carrier frequencies transmitted thereover regardless of changes in the line condition, which consists in subjecting a pilot carrier current to substantially the same transmission conditions as those to which the various carrier currents employed for the transmission of signals are subjected and so controlling the amplitude of the various carrier currents employed for signaling purposes in accordance with the variations in the amplitude of the pilot carrier current as to bring their amplitudes after transmission to substantially their normal values.

14. In a signaling system in which a plurality of signals are simultaneously transmitted over a common conducting path by means of carrier currents of different frequencies, the method of maintaining the transmission substantially constant for all transmission frequencies which consists in transmitting over the conducting path a pilot frequency higher than the carrier frequencies, producing an indication by the pilot frequency transmitted and so adjusting the transmission characteristics of the path in accordance with the indication produced when the indication is abnormal as to substantially restore to normal the transmission of the carrier frequencies.

In testimony whereof, I have signed my name to this specification this 7th day of July, 1920.

HERMAN A. AFFEL.